(12) United States Patent
Chien

(10) Patent No.: US 7,908,506 B2
(45) Date of Patent: Mar. 15, 2011

(54) MEMORY CARD CONTROL CHIP

(75) Inventor: Chih Ching Chien, Chu Pei (TW)

(73) Assignee: Realtek Semiconductor Corp., Hsinchu (TW)

( * ) Notice: Subject to any disclaimer, the term of this patent is extended or adjusted under 35 U.S.C. 154(b) by 803 days.

(21) Appl. No.: 11/889,605

(22) Filed: Aug. 15, 2007

(65) Prior Publication Data

US 2008/0046775 A1 Feb. 21, 2008

(30) Foreign Application Priority Data

Aug. 21, 2006 (TW) ................. 95130575 A

(51) Int. Cl.
*G06F 1/00* (2006.01)
*G06F 1/04* (2006.01)
*H04B 1/00* (2006.01)

(52) U.S. Cl. .......... 713/500; 713/600; 375/130

(58) Field of Classification Search .......... 713/500
See application file for complete search history.

(56) References Cited

U.S. PATENT DOCUMENTS

| | | | | |
|---|---|---|---|---|
| 6,377,646 | B1 * | 4/2002 | Sha | 375/376 |
| 6,748,552 | B2 * | 6/2004 | Seguchi | 714/6 |
| 6,943,438 | B2 * | 9/2005 | Son et al. | 257/679 |
| 6,980,581 | B1 * | 12/2005 | Sha et al. | 375/130 |
| 7,596,047 | B2 * | 9/2009 | Chiang et al. | 365/226 |
| 2004/0030830 | A1 * | 2/2004 | Shimizu | 711/115 |
| 2005/0098637 | A1 * | 5/2005 | Chen | 235/492 |
| 2007/0133729 | A1 * | 6/2007 | Hsiao et al. | 375/374 |

FOREIGN PATENT DOCUMENTS

CN 1504988 A 6/2004

* cited by examiner

*Primary Examiner* — Suresh K Suryawanshi
(74) *Attorney, Agent, or Firm* — Muncy, Geissler, Olds, & Lowe, PLLC

(57) ABSTRACT

The invention discloses a memory card control chip. The memory card control chip comprises a clock generator, a first memory card interface, and a control circuit. The clock generator generates a first clock signal and a second clock signal. The second clock signal is a spread spectrum clock signal. The first memory card interface is coupled to the clock generator and comprises a first clock signal pin and a plurality of first data signal pins. The first memory card interface is connected to a first memory card to be a data transmission interface of the first memory card. The first clock signal pin transmits the second clock signal. The control circuit is coupled to the first memory card interface and receives the first clock signal for performing the data accessing of the first memory card.

23 Claims, 5 Drawing Sheets

MEMORY CARD CONTROL CHIP

BACKGROUND OF THE INVENTION (a) Field of the Invention

The invention relates to a memory card control chip for accessing memory card, and particularly to a memory card control chip for accessing memory card using spread spectrum technology.

(b) Description of the Related Art

In recent years, many different types of flash memory cards are available. Compact Flash (CF), Secure Digital (SD), Multi Media Card (MMC), Memory Stick Pro (MSPRO), xD-picture (xD) and so forth are commonly seen. Due to the wide varieties of applications for flash memory cards, methods for accessing such memory cards are also developed for conveniences. Some manufacturers even equip the desktop or laptop PC with the functionality of accessing such new generation memory cards as the standard build-in accessories. Besides, due to the popularity of the peripherals for accessing memory cards, the requirements of the related specification also become harsher. The certification of electromagnetic interference (EMI) is a typical example.

FIG. 1 illustrates a traditional method for reducing the EMI intensity of a device for accessing memory cards. As shown in FIG. 1, the method utilizes external resistors. One additional resistor is placed in the signal path of the high frequency signal that generates EMI on the circuit board and the resistance of such resistor is generally between tens ohms to hundreds ohms. As an example of the traditional method, a resistor 106 is generally placed in the signal path that connects the SD clock pin of the memory card control chip 102 and the SD card socket 104. Similar approach is also used for other high frequency signals or other types of memory cards. But, as the EMI certification criteria become more stringent, the external resistor with higher resistance must be used for the memory card control chip in order to pass the EMI test. However, increasing the resistance not only costs more money but also reduces the driving ability of the clock signal. Even, incompatible problems may be appeared.

BRIEF SUMMARY OF THE INVENTION

Therefore, one object of the invention is to provide a memory card control chip that uses spread spectrum technology to reduce the EMI problem.

According to one embodiment of the invention, a memory card control chip/card reader for accessing memory card is provided. The memory card control chip comprises a clock generator, a first memory card interface, and a control circuit. The clock generator generates a first clock signal and a second clock signal. The second clock signal is a spread spectrum clock signal. The first memory card interface is coupled to the clock generator and comprises a first clock signal pin and a plurality of first data signal pins. The first memory card interface is connected to a first memory card to be a data transmission interface of the first memory card. The first clock signal pin transmits the second clock signal. The control circuit is coupled to the first memory card interface and receives the first clock signal for performing the data accessing of the first memory card.

According to one embodiment of the invention, a device for accessing memory card is provided. The device for accessing memory card comprises a first memory card socket and a control chip. The first memory card socket is for insertion of a first memory card. The first memory card socket comprises a first clock signal pin and a plurality of first data pins. The control chip is coupled to the first memory card socket. The control chip comprises a clock generator, a first memory card interface, and a control circuit. The clock generator is for generating a first clock signal and a second clock signal. The second clock signal is a spread spectrum clock signal. The first memory card interface is coupled to the first memory card socket for interfacing data transmission with the first memory card. The control circuit is coupled to the first memory card interface and receives the first clock signal for accessing the data in the first memory card. The first clock signal pin of the first memory card socket transmits the second clock signal.

According to one embodiment of the invention, a method for accessing memory card is provided. The method for accessing memory card comprises the following steps. At first, a first memory card interface is provided. The first memory card interface comprises a first clock signal pin and a plurality of first data signal pins. The first memory card interface is connected to a first memory card for transmitting or reading data with the first memory card. Next, a spread spectrum method is utilized to generate a first spread spectrum clock signal. Finally, the first clock signal pin is utilized to transmit the first spread spectrum clock signal to the first memory card.

DETAILED DESCRIPTION OF THE INVENTION

Figure 1:
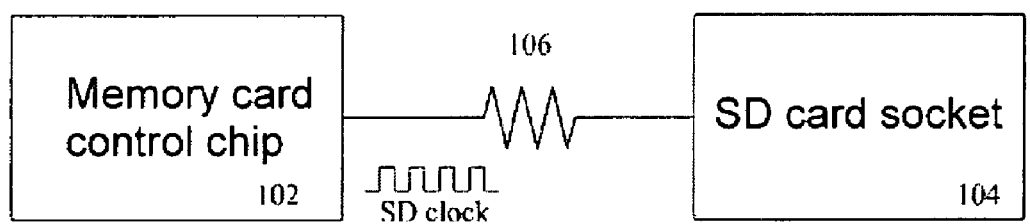
FIG. 1 shows a method illustrating the reduction of EMI intensity of a device for accessing memory card according to the prior art.
Figure 2:
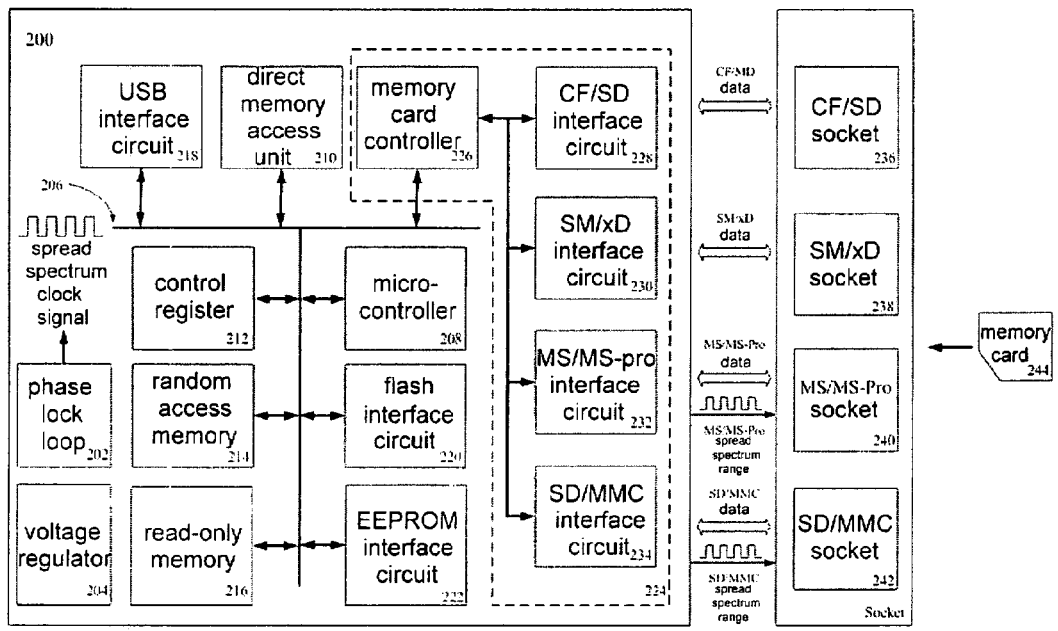
FIG. 2 shows a schematic diagram illustrating a control chip for accessing memory card using spread spectrum technology according to one embodiment of the invention.

FIG. 2 shows a control chip for accessing memory card that uses spread spectrum technology according to the invention. The control chip 200 for accessing memory card comprises a phase lock loop 202 with the function of generating spread spectrum clock, a voltage regulator 204, a bus 206, a microcontroller 208, a direct memory access unit 210, a control register 212, a random access memory 214, a read-only memory 216, a USB interface circuit 218, a flash interface circuit 220, an electrically-erasable programmable read-only memory (EEPROM) interface circuit 222, and a memory card interface unit 224. The memory card interface unit 224 comprises a memory card controller 226, a CF/SD interface circuit 228, a SM/xD interface circuit 230, a MS/MS-pro interface circuit 232, and a SD/MMC interface circuit 234. The memory card interface unit 224 is connected to the external socket of the control chip 200 for accessing data through pin connection in which the socket is connected to a memory card 244 and the different interface circuits are coupled to the different sockets, respectively. As shown in the figure, the CF/SD interface circuit 228 is coupled to a CF/SD socket 236, the SM/xD interface circuit 230 is coupled to a SM/xD socket 238, the MS/MS-pro interface circuit 232 is coupled to a MS/MS-pro socket 240, and the SD/MMC interface circuit 234 is coupled to a SD/MMC socket 242. Furthermore, by utilizing the phase lock loop 202 having the spread spectrum function, the control chip 200 for accessing memory card generates a spread spectrum clock signals and outputs the spread spectrum clock signals to each socket through pin connection, respectively. Besides, each individual socket receives a different clock signal according to the different specification of the memory card for operation.

In the control chip 200 for accessing memory card according to one embodiment of the invention, the micro-controller 208 and the direct memory access unit 210 control the data transmission of each interface circuit through the bus 206. The read-only memory 216 stores the program for being executed by the micro-controller 208. The random access memory 214 is used for data access by the micro-controller 208. The voltage regulator 204 is used for converting the voltage external to the control chip into the rated voltage specified by the control chip. Furthermore, as the control chip 200 performs data accessing process, each interface circuit and each socket operate according to the clock signal. For example, the specified clock of the MMC interface circuit 234 can reach 52 MHz with a tolerance range of 100 KHz. In other words, the highest operating clock of the MMC interface circuit 234 reaches 52.1 MHz. Therefore, when a MMC memory card is inserted in the MMC socket external to the control chip 200 for accessing memory card, the phase lock loop 202 having the spread spectrum function generates a clock signal having a center frequency of 50 MHz and provided to the socket. The upward spreading frequency can reach 52.1 MHz and the downward spreading frequency can reach 47.9 MHz. The control chip 200 for accessing memory card accesses data with the spread spectrum clock signal in order to reduce EMI. According to one embodiment of the invention, the control chip 200 for accessing memory card is coupled to a host through the USB interface 218. Therefore, when a memory card 244 is inserted in the socket, the micro-controller 208 controls the data transmission with the host according to the program stored in the read-only memory 216.

Figure 3:
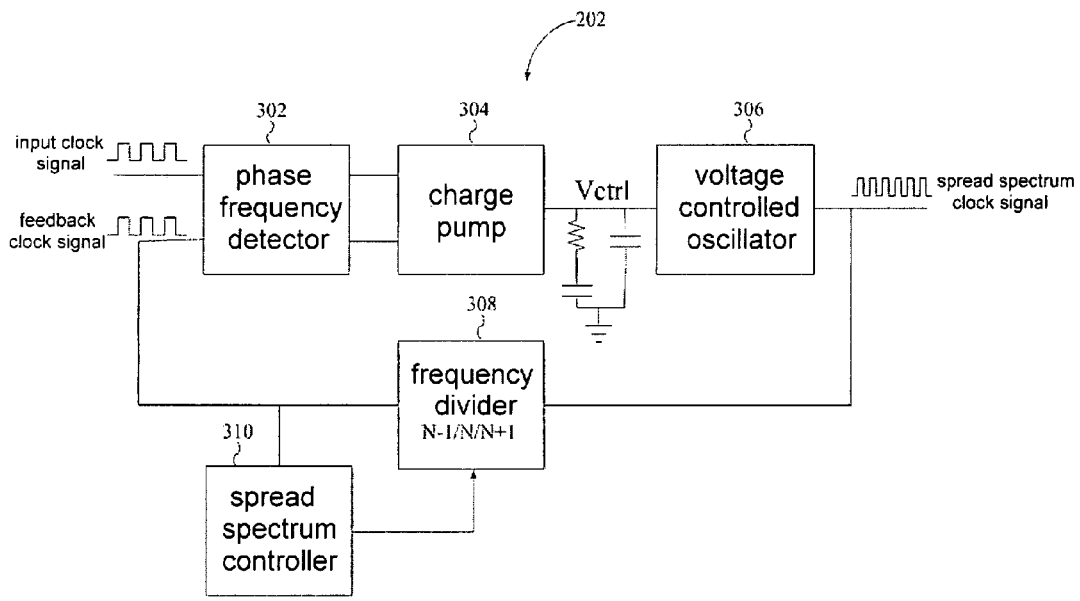
FIG. 3 shows a schematic diagram illustrating an embodiment of a phase lock loop 202 having the spread spectrum function according to the control chip for accessing memory card of one embodiment of the invention.

FIG. 3 shows one embodiment of the phase lock loop 202 having the spread spectrum function in the control chip 200 for accessing memory card according to the invention. The phase lock loop 202 comprises a phase frequency detector 302, a charge pump 304, a voltage controlled oscillator 306, a frequency divider 308, and a spread spectrum controller 310. The phase frequency detector 302 detects the phase and frequency relationship between the input clock signal and the feedback clock signal for generating a detecting signal and then transmitting to the charge pump 304. The charge pump 304 generates a control voltage Vctrl for the voltage controlled oscillator 306 according to the detecting signal. Then, the voltage controlled oscillator 306 generates the spread spectrum clock signal according to the control voltage Vctrl for the various units in the control chip 200 for accessing memory card that needs clock signals, such as the micro-controller 208, the memory card interface unit, and the socket. In one example of the control chip 200 for accessing memory card of the invention, the phase lock loop 202 generates a spread spectrum clock signal for the interface circuit and the socket. Furthermore, the phase lock loop 202 also generates a non-spread spectrum clock signal for the various control circuits, such as the micro-controller 208, the direct memory access unit 210, and so forth. But it is noticed that those of control circuits also could use the spread spectrum clock to perform their own operation. In the phase lock loop 202, the frequency divider 308 generates the feedback clock signal according to the spread spectrum clock signal. The frequency of the spread spectrum signal is N times that of the feedback clock signal in which the N is a natural number. Since the control chip 200 for accessing memory card of the invention utilizes the spread spectrum technology to reduce EMI, the phase lock loop 202 further comprises a spread spectrum controller 310 for dynamically adjusting the N of the frequency divider according to the feedback clock signal in order to achieve the spread spectrum function of the phase lock loop.

Figure 4:
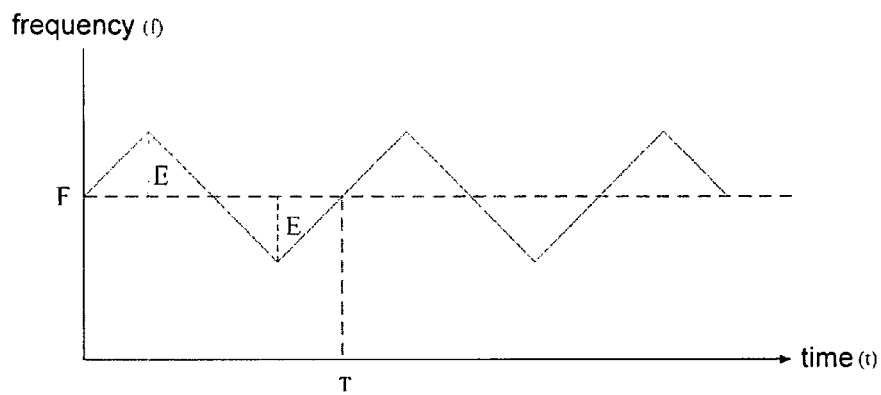
FIG. 4 shows a diagram illustrating the relationship of the frequency variation of the clock signal generated by the phase lock loop with the time according to the control chip for accessing memory card of one embodiment of the invention.

FIG. 4 shows a diagram illustrating the relationship of the frequency variation of the clock signal generated by the phase lock loop 202 with time according to the control chip 200 for accessing memory card of the invention. As shown in FIG. 4, the frequency of the spread spectrum clock signal generated by the phase lock loop having the spread spectrum function changes with time. For example, based on the specification of the MMC memory card interface, the center frequency F generated by the phase lock loop 202 is 50 MHz and the spread spectrum range E is up to 2.1 MHz. That is to say, the maximum frequency is 52.1 MHZ and the lowest frequency is 47.9 MHz so that the frequency is within the tolerable range of the memory card interface. In addition, within one clock period T of the spread spectrum clock, the spread spectrum clock generates the highest spread spectrum clock 52.1 MHz once and the lowest spread spectrum clock 47.9 MHz once. The control chip 200 for accessing memory card according the invention can also use either upward spreading frequency or downward spreading frequency technology to reduce EMI. For example, based on the upward spreading frequency technology, the center frequency F can be increased to 51 MHz and the spread spectrum range E can be 1.1 MHz. Thus, the highest frequency generated is still 52.1 MHz and the lowest frequency is now at 48.9 MHz while the control chip performs the memory card accessing operation. For example, based on the downward spreading frequency technology, the center frequency F can be reduced to 48 MHz and the spread spectrum range E is kept at 2.1 MHz. Thus, the highest frequency generated is 50.1 MHz and the lowest frequency can be as low as 45.9 MHz while the control chip performs the memory card accessing operation. Therefore, for other similar situations, similar operating principle is applied.

Figure 5:
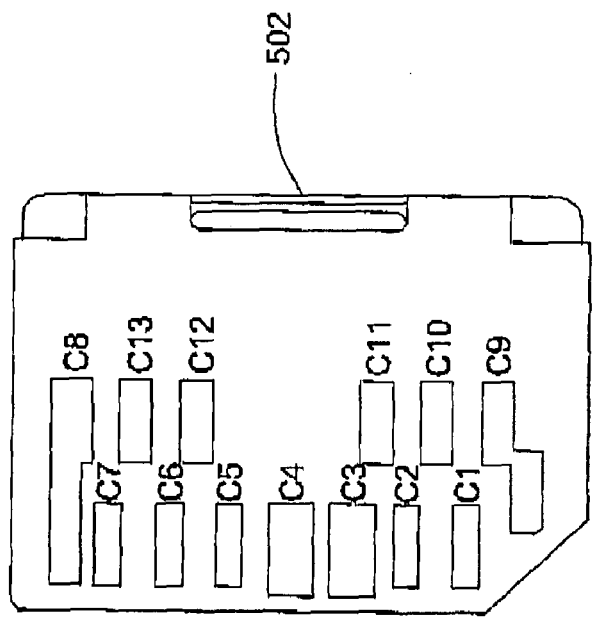
FIG. 5 shows a schematic diagram illustrating the pin assignment of a SD/MMC memory card.

FIG. 5 shows a schematic diagram illustrating the pin assignment of the SD/MMC memory card. As shown in FIG. 5, the SD/MMC memory card 502 comprises C1~C13 pins. Among these, C1, C7~C13 are data pins for data transmission with the control chip for accessing memory card. C3, C4, and C6 are working voltage pins for providing supply voltages to the memory card 502. C2 is a control signal pin for transmitting the control signal to the control chip 200 for accessing memory card. C5 is a clock signal pin for providing the clock signal to the memory card 502. In the control chip 200 for accessing memory card according to the invention, since the clock signal generated by the phase lock loop 202 is a spread spectrum clock signal, the clock signal pin C5 receives a spread spectrum clock signal generated by the control chip 200 for accessing memory card for operation so as to reduce EMI.

Figure 6:
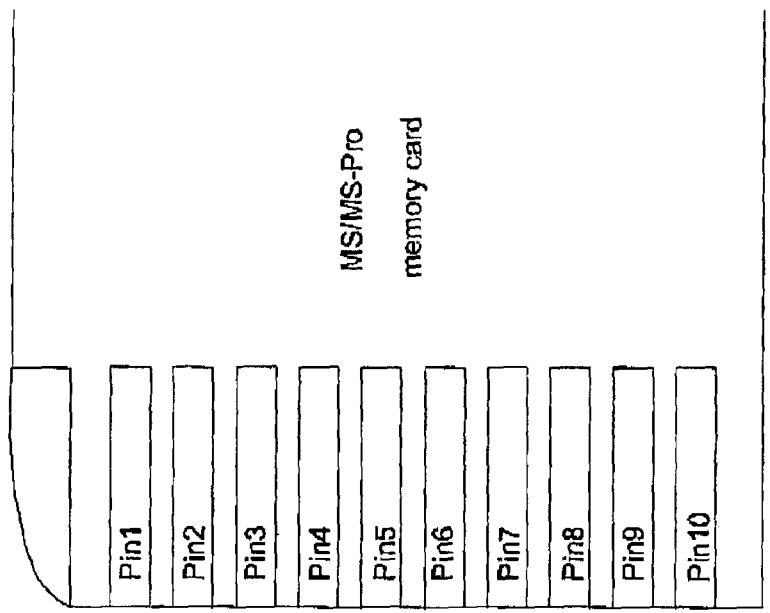
FIG. 6 shows a schematic diagram illustrating the pin assignment of a MS/MS-Pro memory card.

FIG. 6 shows a schematic diagram illustrating the pin assignment of the MS/MS-Pro memory card. As shown in the figure, the MS/MS-Pro memory card comprises Pin1~Pin10 pins. Among these, Pin3~Pin5 and Pin7 are data pins for data transmission with the control chip for accessing memory card. Pin1, Pin9, and Pin10 are supply voltage pins for providing supply voltages to the MS/MS-Pro memory card. Pin2 and Pin6 are control signal pins for transmitting control signals to the control chip for accessing memory card. Pin8 is the clock signal pin for providing the clock signal to the MS/MS-Pro memory card. In the control chip 200 for accessing memory card according to the invention, since the clock signal generated by the phase lock loop 202 is a spread spectrum clock signal, the clock signal pin Pin6 receives a spread spectrum clock signal generated by the control chip 200 for accessing memory card for operation so as to reduce EMI.

Although the embodiments according to the invention use the specification of the MMC memory card as examples, the spread spectrum clock signal can also be applied to other types of the memory card interfaces, such as the CF/SD interface, the SM/xD interface, the MS/MS-pro interface, and the SD interface, for reducing EMI. Furthermore, in the control chip 200 for accessing memory card according to the invention, the micro-controller 208, the direct memory access unit 210, the control register 212, the random access memory 214, the read-only memory 216, belonging to part of the control unit, can be integrated into one control module, such as a special application specific integrated circuit (ASIC), a hardware circuit or hardware together with firmware. Moreover, in the control chip 200 for accessing memory card, the interface circuits, such as the flash interface circuit 220, electrically-erasable read-only memory (EEPROM) interface circuit 222, and the various interface circuits of the memory card interface unit 224, can be implemented according to the criteria of the interface by omitting the un-used interface circuits or adding the needed interface circuits. In addition, although the control chip 200 for accessing memory card is connected to the host through the USB interface in the embodiments, other suitable interfaces, such as the PCI interface, the IEEE1394, can also be used in the connection between the control chip and the host. Obviously, the spread spectrum clock signal is also used in the interface for connecting the host to reduce EMI. Although the output pin of the spread spectrum clock signal of the control chip 200 for accessing memory card is connected to the corresponding sockets according to the invention, a resistor can be placed on that pin to further reduce EMI. It is to be considered within the scope of the invention.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein. Various modifications and changes can be made by those who are skilled in the art without deviating from the essence of the invention.

What is claimed is:

1. A memory card controller for accessing memory card, comprising:
    a clock generator for generating a first clock signal and a second clock signal, wherein the second clock signal is a spread spectrum clock signal;
    a first memory card interface being coupled to the clock generator and comprising a first clock signal pin and a first data signal pin, wherein the first memory card interface is used for transmitting data and reading data with a first memory card via the first data signal pin and transmitting the second clock signal to the first memory card via the first clock signal pin; and
    a control circuit being coupled to the first memory card interface and receiving the first clock signal or the second clock signal for performing the data accessing of the first memory card.

2. The memory card controller according to claim 1, wherein the control circuit comprises:
    a program memory for storing a program; and
    a controller coupled to the program memory for executing the data accessing of the first memory card according to the program.

3. The memory card controller according to claim 2, wherein the control circuit further comprises a direct memory access circuit (DMA) coupled to the first memory card interface for directly accessing the data in the first memory card.

4. The memory card controller according to claim 1, further comprising:
    a first interface coupled to a host, wherein the control circuit performs data transfer with the host through the first interface.

5. The memory card controller according to claim 4, wherein the first interface is a universal serial bus (USB) interface.

6. The memory card controller according to claim 1, wherein the clock generator comprises:
    a phase frequency detector for detecting an input clock signal and a feedback clock signal to generate a detecting signal;
    a charge pump for generating a control voltage according to the detecting signal;
    a voltage controlled oscillator for generating the second clock signal according to the control voltage;
    a frequency divider for dividing the second clock signal to generate the feedback clock signal according to a control signal; and
    a spread spectrum controller for generating the control signal to the frequency divider according to the feedback clock signal.

7. The memory card controller according to claim 1, wherein the clock generator generates a third clock signal, the memory card controller further comprises:
    a second memory card interface comprising a second data signal pin and a second clock pin, wherein the second memory card interface is used for transmitting data or reading data with a second memory card via the second data signal pin and transmitting the third clock signal to the second memory card via the second clock pin.

8. The memory card controller according to claim 7, wherein the third clock signal is a spread spectrum clock signal.

9. The memory card controller according to claim 1, wherein the second clock signal has a spread spectrum range that is within a tolerable range of the first memory card.

10. The memory card controller according to claim 1, wherein the first memory card interface is a SD, MS or MMC memory card interface.

11. An apparatus for accessing memory card, comprising:
    a first memory card socket, comprising a first clock signal pin and a first data pin, for insertion of a first memory card; and
    a chip being coupled to the first memory card socket, comprising:
        a clock generator for generating a first clock signal and a second clock signal, wherein the second clock signal is a spread spectrum clock signal;
        a first memory card interface coupled to the first memory card socket for transmitting data and reading data with the first memory card via the first data pin and transmitting the second clock signal via the first clock signal pin; and a control circuit, coupled to the first memory card interface and receiving the first clock signal or the second clock signal, for performing the data accessing of the first memory card.

12. The apparatus according to claim 11, wherein the control circuit comprises:

a program memory for storing a program; and a controller coupled to the program memory for executing the data accessing of the first memory card according to the program.

13. The apparatus according to claim 11, wherein the control circuit further comprises a direct memory access circuit (DMA) coupled to the first memory card interface for directly accessing the data in the first memory card.

14. The apparatus according to claim 11, wherein the clock generator comprises:

a phase frequency detector for detecting an input clock signal and a feedback clock signal to generate a detecting signal;

a charge pump for generating a control voltage according to the detecting signal;

a voltage controlled oscillator for generating the second clock signal according to the control voltage;

a frequency divider for dividing the second clock signal to generate the feedback clock signal according to a control signal; and a spread spectrum controller for generating the control signal to the frequency divider according to the feedback clock signal.

15. The apparatus according to claim 13, wherein the first memory card interface is a SD, MS or MMC memory card interface.

16. A method for accessing memory card comprising:

providing a first memory card interface, wherein the first memory card interface comprises a first clock signal pin and a first data signal pin; and the first memory card interface is used for transmitting data and reading data with a first memory card via the first data signal;

generating a first spread spectrum clock signal by a clock generator; and utilizing the first clock signal pin to transmit the first spread spectrum clock signal to the first memory card.

17. The method according to claim 16, further comprising:

accessing the data in the first memory card according to a series of instructions.

18. The method according to claim 17, wherein the series of instructions are implemented by hardware circuit.

19. The method according to claim 16, further comprising:

utilizing a direct memory access circuit (DMA) to access the data in the first memory card.

20. The method according to claim 16, wherein the first memory card interface is an SD, MS or MMC memory card interface.

21. The memory card controller according to claim 1, wherein the first clock signal is a non-spread spectrum clock signal.

22. The memory card controller according to claim 11, wherein the first clock signal is a non-spread spectrum clock signal.

23. The method according to claim 16, further comprising:

generating a first non-spread spectrum clock signal.

* * * * *